United States Patent Office 3,752,853
Patented Aug. 14, 1973

3,752,853
GEM-DIFLUOROAMINO UNSATURATED HYDROCARBONS
Charles M. Orlando, Union City, Ferdinand Cataneo, Cranford, and Lawrence J. Engel, Dunellen, N.J., assignors to Esso Research and Engineering Company
No Drawing. Filed June 14, 1963, Ser. No. 289,770
Int. Cl. C07c 87/22
U.S. Cl. 260—583 NH     8 Claims This invention relates to the preparation of novel difluoramino organic compounds characterized by having an internal —$(NF_2)C(NF_2)$— structure between aliphatic groups, R' and R'', at least one of which contains a reactive unsaturated function, i.e., a doubly to triply bonded pair of carbon atoms as in the following general formula:

$$R'—(NF_2)C(NF_2)—R''$$

A specific typical example of the reactive gem difluoramino olefins is the compound 3,3-bis(difluoramino)butene-1 having the structural formula:

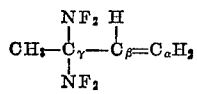

in which the methyl group, $CH_3$—, is the R' group and the vinyl group, —$CH=CH_2$, is the R'' group that has the double bond between the pair of alpha and beta carbon atoms, the carbon atom of the gem structure being in the gamma position.

The novel unsaturated difluoramino compounds having the gem ($NF_2$) structure are useful for making higher-energy oxidizers of importance as rocket propellant components, e.g., the $N_2F_4$ adduct of the 3,3-bis(difluoramino)butene-1 which is termed 1,2,3,3-tetrakis(difluoramino) butane and which has the composition:

$$CH_3—(NF_2)C(NF_2)—CH(NF_2)CH_2(NF_2)$$

Although the gem structure tetrakis(NF) compound is similar in composition to 1,2,3,4-tetrakis($NF_2$)butane, which is already known to be a useful liquid oxidizer and plasticizer for solid rocket propellants, it has distinctive properties which can be attributed to the gem ($NF_2$) structure, such as different bond strengths and resistance to decomopsition by alkaline compounds.

The discovery that the unsaturated gem difluoramino compounds can be formed successfully now opens the way to the preparation of a variety of energetic compounds because the reactive unsaturated groups make these compounds intermediates for preparing higher-energy oxidizers, oxidizers with other reactive functional groups, polymers, polymerizable epoxides, ozonides, and other derivatives.

The synthesis of the gem (—$NF_2$) unsaturates involves replacement of carbonyl-oxygen in a haloketone, two $NF_2$ groups and dehydrohalogenation of the resulting gem (—$NF_2$) halide to generate a double or triple bond linkage between pairs of terminal carbon atoms, i.e., alpha and beta as per formula.

A number of gem ($NF_2$) halides have been prepared from haloketones and on analysis were found to have the desired structures that made them suitable for dehydrohalogenation. Gem ($NF_2$) halides derived from halogenated ketones are dehydrohalogenated to gem ($NF_2$) unsaturates as shown in the following list:

| Gem ($NH_2$) halide | Gem ($NH_2$) unsaturates |
|---|---|
| $CH_3$—$\underset{NF_2}{\overset{NF_2}{C}}$—$CH_2$—$\overset{Cl}{C}H_2$ | $CH_3$—$\underset{NF_2}{\overset{NF_2}{C}}$—$CH=CH_2$ |
| from 4-chlorobutanone-2 | |
| $CH_3$—$\underset{NF_2}{\overset{NF_2}{C}}$—$\overset{Br}{C}H$—$\overset{Br}{C}H_2$ | $CH_3$—$\underset{NF_2}{\overset{NF_2}{C}}$—$C\equiv CH$ |
| from 3,4-dibromobutanone-2 | |
| $\overset{Cl}{C}H_2$—$CH_2$—$\underset{NF_2}{\overset{NF_2}{C}}$—$CH_2$—$\overset{Cl}{C}H_2$ | $CH_2=CH$—$\underset{NF_2}{\overset{NF_2}{C}}$—$CH=CH_2$ |
| from 1,5-dichloropentanone-3 | |
| $\overset{Br}{C}H_2$—$\overset{Br}{C}H$—$\underset{NF_2}{\overset{NF_2}{C}}$—$\overset{Br}{C}H$—$\overset{Br}{C}H_2$ | $CH\equiv C$—$\underset{NF_2}{\overset{NF_2}{C}}$—$C\equiv CH$ |
| from 1,2,4,5-tetrabromopentanone-3 | |
| $\overset{Br}{H_2C}$—$CH_2$—$\underset{NF_2}{\overset{NF_2}{C}}$—$\overset{Br}{C}H$—$\overset{Br}{C}H_2$ | $H_2C=CH$—$\underset{NF_2}{\overset{NF_2}{C}}$—$C\equiv CH$ |
| from 1,4,5-tribromopentanone-3 | |
| $CH_3$—$\underset{NF_2}{\overset{NF_2}{C}}$—$CH_2$—$\overset{Cl}{C}H$—$\overset{Cl}{C}H_2$ | $CH_3$—$\underset{NF_2}{\overset{NF_2}{C}}$—$CH$—$CH=CH$ |
| from 4,5-dichloropentanone-2 | |

This list can be continued to include other gem ($NF_2$) and halo-substituted alkanes and cycloalkanes, e.g., such as derived from halohexanones and halocyclohexanone, particularly 3-chloro-1,1-bis($NF_2$)cyclohexane, and dehydrohalogenation derivatives.

In general, the gem difluoramino and halo substituted alkanes are represented by the formula:

$$X_nR(NF_2)_2$$

wherein R is the substituted alkane nucleus of 4 to 6 carbon atoms, e.g., butane, pentane, hexane, or cyclohexane, the two $NF_2$ substituents being attached to an internal carbon atom in the chain, and X is the halogen substituent, preferably Cl or Br, linked to other carbon atoms in the chain, $n$ being 1 to 4, a halogen substituent being preferably on a second carbon atom in sequence from the carbon linked to the $NF_2$ substituents as in compounds having the following formulas:

| Gem ($NF_2$) halides | Unsaturates |
|---|---|
| $CH_3$—$C(NF_2)_2$—$CH_2$—$CHX$—$CH_2X$ | $CH_3$—$C(NF_2)_2$—$CH_2$—$CH=CH_2$ |
| $CH_3$—$C(NF_2)_2$—$CH_2$—$CH_2X$ | $CH_3$—$C(NF_2)_2$—$CH=CH_2$ |
| $CH_3$—$C(NF_2)_2$—$CHX$—$CH_2X$ | $CH_3$—$C(NF_2)_2$—$C\equiv CH$ |
| $CH_2X$—$CH_2$—$C(NF_2)_2$—$CH_2$—$CH_2X$ | $CH_2=CH$—$C(NF_2)_2$—$CH=CH_2$ |
| $CH_2X$—$CHX$—$C(NF_2)_2$—$CHX$—$CH_2X$ | $CH\equiv C$—$C(NF_2)_2$—$C\equiv CH$ |
| $CH_2X$—$CH_2$—$C(NF_2)_2$—$CHX$—$CH_2X$ | $CH_2=CH$—$C(NF_2)_2$—$C\equiv CH$ |
| $CHX_2$—$CH_2$—$C(NF_2)_2$—$CH_2$—$CH_2X$ | $CH\equiv C$—$C(NF_2)_2$—$CH=CH_2$ |
| $CH_3$—$CX_2$—$CH_2$—$C(NF_2)_2$—$CH_3$ | $CH_3$—$C\equiv C$—$C(NF_2)_2$—$CH_3$ |
| $CH_3$—$CX_2$—$CH_2$—$C(NF_2)_2$—$CH_2$—$CH_2X$ | $CH_3$—$C\equiv C$—$C(NF_2)_2$—$CH=CH_2$ |

In each instance a carbon atom adjacent or vicinal to the carbon atom bearing the halogen donates hydrogen involved in the dehydrohalogenation process, i.e., for splitting off HX and generating an unsaturated bond. An alkyl radical may be linked to the carbon in the gem ($NF_2$) group with a halogen substituted alkyl radical or both radicals linked to the carbon in the gem ($NF_2$) carbyl group may be halogen substituted in the manner described.

The reactions for preparing the described gem ($NF_2$) and halo substituted alkanes and cycloalkanes were carried out in glass reactors generally using a 5/10/1 mole ratio of $H_2SO_4$/$HNF_2$/ketone. The reaction technique preferably involved a two-stage contact. The sulfuric acid is held in a frozen state in the bottom of the reactor. The haloketone is added, then the $HNF_2$. By careful lowering of the cooling bath surrounding the reactor the temperature is raised in such a way as to maintain the $H_2SO_4$ in a solid state while the $HNF_2$ and haloketone melt and mix. The mixture is allowed to warm and final conversion of the gem structure is obtained by substitution of the $NF_2$ groups for the keto oxygen.

The method of forming the gem structure results in high product yields and prevents destruction of the ketone by the acid prior to an initial reaction with $HNF_2$.

The method described was found suitable for preparing the gem ($NF_2$) substituted product from 5-chloropentanone-2; however, with the halogen thus linked to a carbon further removed with respect to the carbon in the —$C(NF_2)_2$— group, the dehydrohalogenation is more difficult.

From data thus far obtained, one structural feature is indicated to be required for facile dehydrohalogenation of the gem ($NF_2$) halo compounds. These compounds preferably should have a halogen linked to a carbon atom which is second in sequence from the carbon atom in the —$C(NF_2)_2$— moiety. Surprisingly, such gem ($NF_2$) halo compounds undergo dehydrohalogenation in the presence of an alkaline reagent without destruction of the gem ($NF_2$) structure. The method of dehydrohalogenation is illustrated by the following examples:

EXAMPLE 1

Preparation of 3,3-bis(difluoramino)butene-1
$$CH_3C(NF_2)_2CH=CH_2$$

0.618 g. of 3,3-bis($NF_2$)chlorobutane-1 was added to 2 cc. of a potassium hydroxide-triethyleneglycol solution (2.8 g. of powdered KOH in 10 cc. of triethylene glycol with one hour stirring at room temperature, liquor decanted and used as the alkaline reagent) to form a reaction mixture. The reaction mixture was stirred for 2½ hours under vacuum at room temperature, e.g., 20° to 25° C. to obtain dehydrohalogenation. A colorless liquid product was distilled from the reaction mixture which weighed 0.451 g. (90% yield) and was identified as the gem butene. The analytical, NMR and IR data obtained on the product are entirely consistent with the assigned structure:

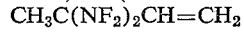

Other gem difluoramino compounds can be subjected to alkaline dehydrohalogenation to obtain alpha-beta double bonds and triple bonds.

The alkaline dehydrohalogenation was extended successfully to the reaction of dihalo gem difluoramino compounds to achieve the formation of a triple bond between the alpha and beta atoms. This is illustrated by the following example.

EXAMPLE 2

Preparation of 3,3-bis(difluoramino)butyne-1
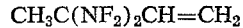

0.376 g. of 1,2-dibromo-3,3-bis(difluoramino)butane was added to 3 cc. of a solution of potassium hydroxide-triethylene glycol (the same reagent is used in the other dehydrohalogenations) and stirred in vacuum at room temperature in the range of 20° to 30° C. for 5 hours. An extremely volatile colorless liquid product (at 0° C.) was obtained. The product was shown to be a mixture of 80% I and 20% II.

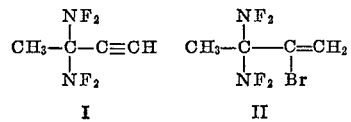

The structure assignments are made on the basis of NMR and IR data. A molecular determination of the acetylene adduct using vapor density method gives a value of 174 (theoretical 156).

The mixed acetylene I and olefin II product composition remained unaltered upon extending the reaction time. The NMR spectrum analysis indicated absence of an isomer of the olefin product in which the bromine would be attached to a terminal CH group. Both the acetylene product I and olefin product II may be used as intermediates for a further reaction, as for example with $N_2F_4$ or $HNF_2$, to add additional $NF_2$ groups, or may be reacted with other reactants which form adducts.

EXAMPLE 3

Preparation of 3,3-bis($NF_2$)pentadiene-1,4

1,5 - dichloro - 3,3 - bis(difluoramino)pentane (0.212 g.) formed from 1,5-dichloropentanone-3 reacted with $HNF_2$ was reacted with 3 cc. of a solution of potassium hydroxide in triethylene glycol at room temperature to obtain a volatile liquid dehydrohalogenation product. This product was identified by analysis including infrared spectrum to be the diolefin:

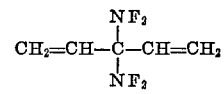

This recovered diolefin product is 3,3-bis($NF_2$)pentadiene-1,4.

This gem difluoramino compound is useful for further $N_2F_4$ addition.

In general, the dehydrohalogenations were effectively carried out using KOH in triethylene glycol but other dehydrohalogenating reactants may be used. The alkaline dehydrohalogenating reactants that are most suitable are those which can be used at ordinary or moderate temperatures, e.g., in the range of 20° to 60° C., and which permit convenient separation.

It has been demonstrated that the gem ($NF_2$) olefinic compounds can be reacted with $N_2F_4$ to form the adducts as described in the following example.

EXAMPLE 4

Preparation of $N_2F_4$ adducts of the gem olefins

The reaction of 3,3-bis($NF_2$)butene-1 with $N_2F_4$ was carried out in stainless steel reactors using a 10/5/1 mole ratio of inert halo carbon diluent/$N_2F_4$/3,3-bis($NF_2$) butene-1. After 4 hours at 100° C. approximately half the 3,3-bis($NF_2$)butene-1 starting material was reacted. Reactions at 150° and 200° C. produced similar products, the primary products being a water-white volatile liquid. Separations were made of fractions of the product by gas chromatography and a substantial proportion of the product was analyzed to be the desired 1,2,3,3-tetrakis-difluoramino butane having the structure:

From initial experiments it was found that the reaction can be controlled to optimize the addition of two $NF_2$ groups to the double bonded carbons.

Another reaction to which the gem difluoramino olefinic compounds can be subjected is an ozonolysis to obtain ozonide, which may in turn be converted to compounds having a ketone and aldehyde function. The ozonolysis is illustrated in the following example.

EXAMPLE 5

Preparation of ozonide of 3,3-bis($NF_2$)butene-1

A stream of oxygen containing ozone was bubbled through a solution of 3,3-bis(difluoramino)butene-1 at 0° C. The product obtained after the carbon tetrachloride solvent was removed was a nonvolatile oil. Since the oil product was considered to have potentialities of being explosive, a complete purification was not attempted. The infrared spectrum indicated that the product clearly retained the gem ($NF_2$) configuration and that an ozonide linkage replaced the double bond. The reaction and the product therefore are shown as follows:

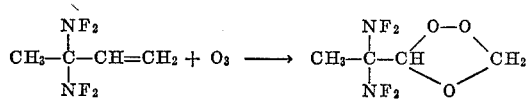

The ozonide shown may be subjected to a reductive decomposition to prepare 2,2-bis($NF_2$)propionaldehyde which in turn may be further reacted with $HNF_2$.

Products formed by addition of $NF_2$ groups to the unsaturated gem ($NF_2$) compounds fall into the category of $CNF_2$ oxidizers suitable for use with energetic binders, e.g., $CNF_2$ polymers, metals, metal hydrides, and oxygen oxidizers for making solid rocket propellants having Isp values above 270.

The invention described is claimed as follows:

1. The compound 3,3-bis(difluoramino)butyne-1 having the formula:

$$CH_3C(NF_2)_2C\equiv CH$$

2. The compound 3,3-bis(difluoramino)pentadiene-1,4 having the formula:

$$CH_2=CHC(NF_2)_2CH=CH_2$$

3. The compound 3,3-bis(difluoramino)pentadiyne-1,4 having the formula:

$$CH\equiv C-C(NF_2)_2-C\equiv CH$$

4. The compound 3,3-bis(difluoramino)pentyne-1 having the formula:

$$CH_3-C(NF_2)_2-CH_2-C\equiv CH$$

5. Method of preparing an unsaturated internal gem (difluoramino) substituted aliphatic hydrocarbon which comprises dehydrohalogenating a gem difluoramino and halogen substituted alkane from which hydrogen and halogen are removed for generating an unsaturated bond between pairs of carbon atoms, and recovering a resulting unsaturated internal gem difluoramino substituted aliphatic hydrocarbon product.

6. The method of claim 5 in which the dehydrohalogenation is effected by reaction of the gem difluoramino substituted saturated hydrocarbon with an alkaline dehydrohalogenation reactant at a temperature in the range of about 20° to 60° C.

7. The method of claim 5 in which halogen is removed from a terminal alpha carbon atom with hydrogen from a vicinal beta carbon atom to obtain alpha-beta unsaturation, carbon linked to gem ($NF_2$) groups being in the gamma position of the substituted alkane that has a chain of 4 to 6 carbon atoms.

8. Method of preparing an internal gem difluoramino substituted unsaturated aliphatic hydrocarbon product which comprises reacting a dehydrohalogenating reactant with a halogen substituted saturated aliphatic hydrocarbon selected from the group of compounds having the following formulas:

$$CH_3-C(NF_2)_2-CH_2-CHX-CH_2X$$
$$CH_3-C(NF_2)_2-CH_2-CH_2X$$
$$CH_3-C(NF_2)_2-CHX-CH_2X$$
$$CH_2X-CH_2-C(NF_2)_2-CH_2-CH_2X$$
$$CH_2X-CHX-C(NF_2)_2-CHX-CH_2X$$
$$CH_2X-CH_2-C(NF_2)_2-CHX-CH_2X$$
$$CHX_2-CH_2-C(NF_2)_2-CHX-CH_2X$$
$$CH_3-CX_2-CH_2-C(NF_2)_2-CH_2-CH_2X$$
$$CH_3-CH_2-C(NF_2)_2-CH_3$$

wherein X represents a halogen selected from the group consisting of chlorine and bromine to remove the halogen with hydrogen from a vicinal carbon atom, and recovering the unsaturated product containing the gem difluoramino group.

References Cited
UNITED STATES PATENTS

| | | | |
|---|---|---|---|
| 3,351,663 | 11/1967 | Guthrie | 260—583 NH |
| 3,354,210 | 11/1967 | Beach et al. | 260—563 |
| 3,425,922 | 2/1969 | Guthrie | 204—158 |
| 3,551,496 | 12/1970 | Passannante et al. | 260—583 NH |

LELAND A. SEBASTIAN, Primary Examiner

U.S. Cl. X.R.

149—19, 109